United States Patent
Nishiguchi et al.

[11] Patent Number: 6,067,138
[45] Date of Patent: May 23, 2000

[54] RETARDATION FILM AND METHOD FOR PRODUCING THE SAME, AND LIQUID CRYSTAL DISPLAY DEVICE

[75] Inventors: Kenji Nishiguchi, Osaka; Makoto Shiomi, Tenri, both of Japan

[73] Assignee: Sharp Kabushiki Kaisha, Osaka, Japan

[21] Appl. No.: 08/695,014

[22] Filed: Aug. 9, 1996

[30] Foreign Application Priority Data

Aug. 11, 1995 [JP] Japan ..................................... 7-206361

[51] Int. Cl.7 .................................................. G02F 1/1333
[52] U.S. Cl. ........................... 349/117; 349/183; 349/193
[58] Field of Search .............................. 349/75, 187, 117, 349/183, 191, 160, 193; 428/1; 430/20; 359/500

[56] References Cited

U.S. PATENT DOCUMENTS

| | | | |
|---|---|---|---|
| 5,473,450 | 12/1995 | Yamada et al. | 359/51 |
| 5,499,126 | 3/1996 | Abileah et al. | 349/117 |
| 5,559,617 | 9/1996 | Mitsui et al. | 349/117 |
| 5,831,703 | 11/1998 | Nishiguchi et al. | 349/117 |

FOREIGN PATENT DOCUMENTS

| | | |
|---|---|---|
| 56-99384 | 8/1981 | Japan. |
| 59-201021 | 11/1984 | Japan. |

OTHER PUBLICATIONS

K. Ichimura. "Optical Alignment Control for Liquid Crystal Molecules." *Applied Physics*, vol. 62, No. 10, pp. 998–1001, 1993.

H. Hasebe et al. "Properties of Novel UV Curable Liquid Crystals and Its Retardation Film" *International Display Research Conference*, pp. 161–164, 1994.

*Primary Examiner*—William L. Sikes
*Assistant Examiner*—Tai V. Duong
*Attorney, Agent, or Firm*—David G. Conlin; George W. Neuner; Dike, Bronstein, Roberts & Cushman LLP

[57] ABSTRACT

A retardation film made of a polymerized liquid crystal material of the present invention includes: a first region having a first flat surface pattern; and a second region having a second flat surface pattern, wherein a thickness in the first region is different from that in the second region, thereby retardations in the first region and in the second region are different from each other.

3 Claims, 8 Drawing Sheets

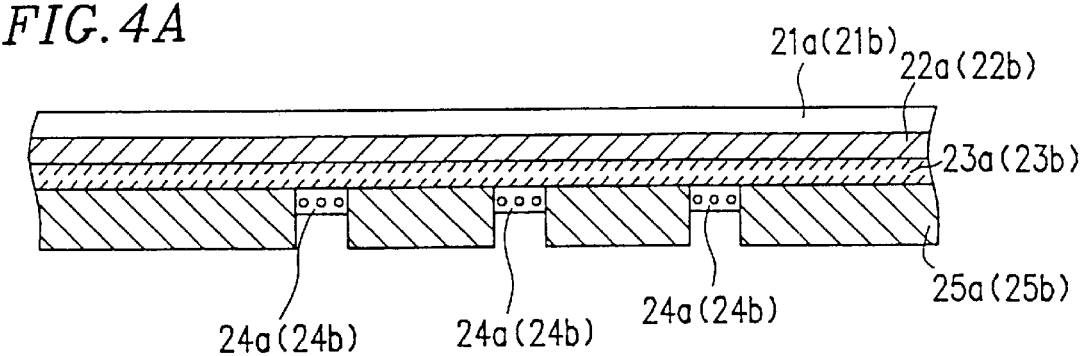
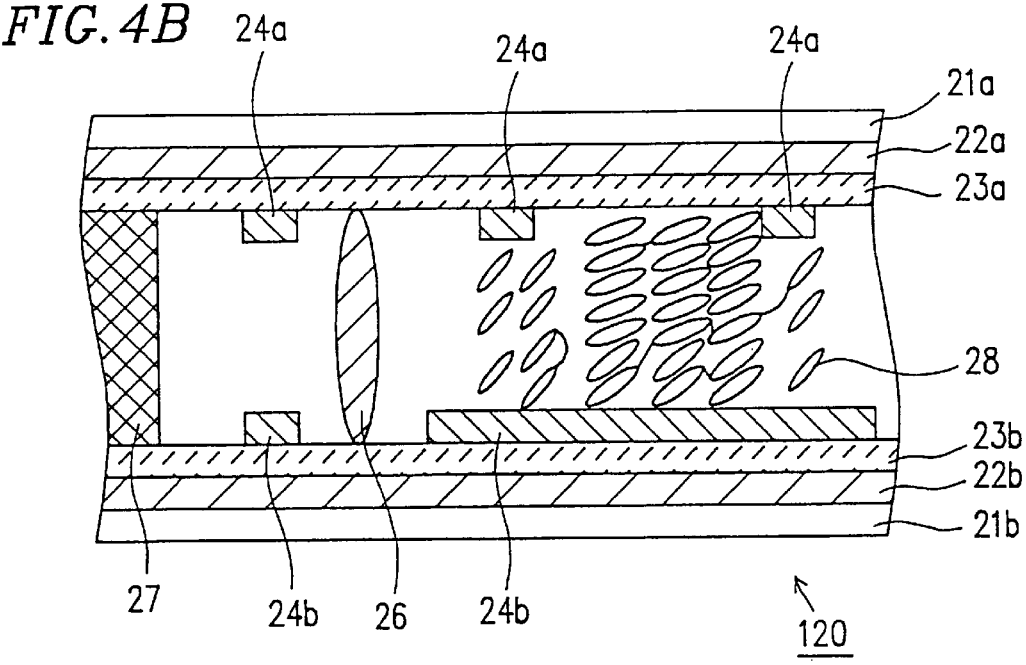

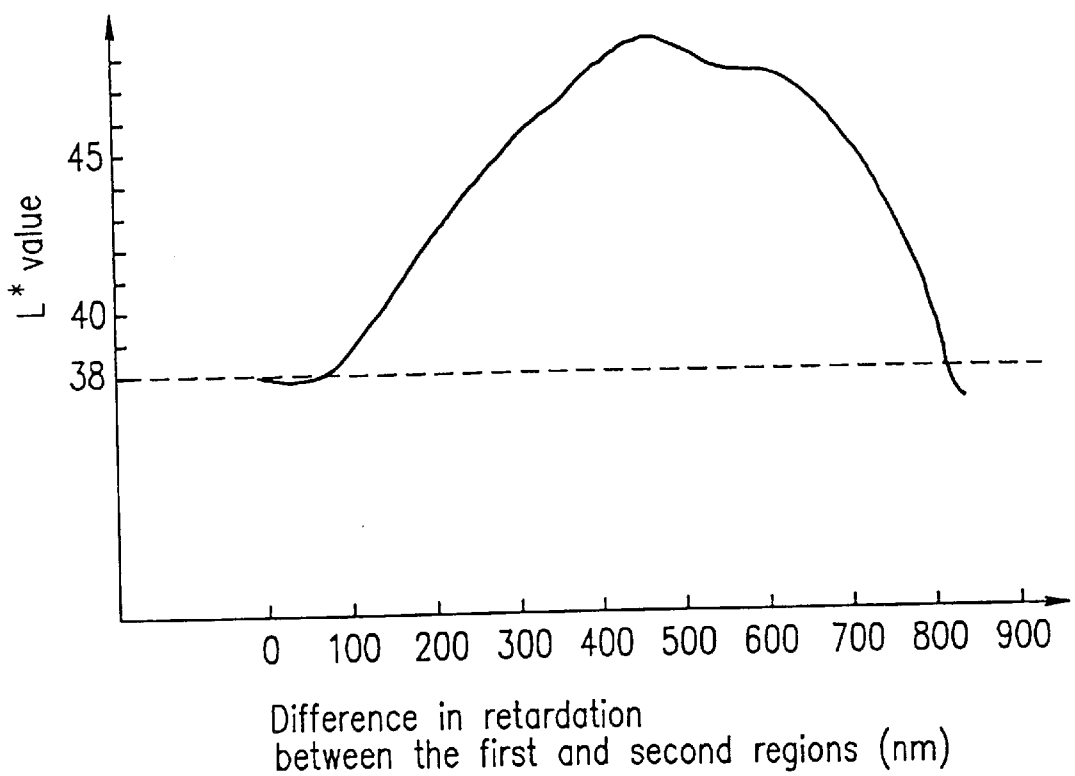

RETARDATION FILM AND METHOD FOR PRODUCING THE SAME, AND LIQUID CRYSTAL DISPLAY DEVICE

BACKGROUND OF THE INVENTION

1. Field of the Invention

The present invention relates to a retardation film, a method for producing the same and a liquid crystal display device. More particularly, the present invention relates to a retardation film having a structure where the retardation differs depending on the location and a method for producing the same. Furthermore, it relates to a liquid crystal display device using the retardation film having the above-mentioned structure or the substrate having a structure where the retardation differs depending on the location.

2. Description of the Related Art

Conventionally, a liquid crystal display device having a structure where optically isotropic polymers and optically anisotropic liquid crystal material are interposed between a pair of substrates has been used in a flat panel display apparatus for personal computers or the like, a liquid crystal TV apparatus, a portable display apparatus, etc. A retardation film according to the present invention can be used in these display apparatuses.

Conventionally, a retardation film is produced by drawing a polymer film in one direction so that polymer main chains are aligned in one direction. This creates anisotropy with respect to a refractive index in the polymer film so that a phase difference is produced between ordinary light and extraordinary light when light is transmitted through the retardation film.

Also, a method for controlling the tilt angles of the liquid crystal molecules using organic molecules is conventionally available. In Applied Physics No. 62, October (1993), a method is reported where a photoisomerization reaction of photochromic molecules is used.

The principle of this method is as follows. When linearly polarized light is irradiated onto certain photochromic molecules bonded to the substrate surface, structural isomerization from trans-form to cis-form occurs in the photochromic molecules. If a liquid crystal material is disposed on the substrate surface having the photochromic molecules bonded thereto in which such structural isomerization occurs, the tilt angle of the liquid crystal molecules with respect to the substrate can be varied in accordance with the structural change of the photochromic molecules.

Here, methods for forming an organic molecular layer having a desired pattern include, for example, a method where a polymerizable resin is applied onto the substrate by screen printing; and a method where a polymerizable resin which can be patterned such as a resist is applied onto the substrate and then, using a mask, the substrate is exposed to light so as to polymerize the resin.

As a technology for improving the mechanical strength of a panel in a liquid crystal display device, a structure has been proposed where stalls made of polymer, or the like, are disposed as reinforcing members against external mechanical force on the periphery of the portion in which a plurality of pixels are arranged.

For example, Japanese Laid-Open Patent Publication No. 56-99384 discloses a liquid crystal display device having a structure where polymer column members made of a resist are disposed in the portions other than the portions where the pixels are arranged, so as to be used as spacers.

Moreover, Japanese Laid-Open Patent Publication No. 59-201021 discloses a liquid crystal display device, which is similar to the one described in the above-mentioned publication, having a structure where wall members made of a photosensitive resin or the like are disposed in a stripe shape in the portions other than the portion where the pixels are arranged, so as to be used as spacers.

Furthermore, Japanese Laid-Open Patent Publication No. 6-301015, which corresponds to U.S. Pat. No. 5,473,450, discloses a liquid crystal display device having a reinforcing member formed by the phase separation of the mixture of the photopolymerizable material and the liquid crystal material. The mixture conducts the phase separation by light irradiation, so that the polymer forms the walls (reinforcing members) each of which encircles the pixel and the liquid crystal material is positioned inside the region encircled by the wall.

However, the following problems are present in the conventional method for producing a retardation film.

Since, in a conventional method for producing a retardation film by drawing, a polymer film is uniformly drawn in one direction so as to create anisotropy of a refractive index in the polymer film, it is considerably difficult to appropriately vary the retardation within a single sheet of retardation film depending on the location.

In a method where the tilt angles of the polymerized liquid crystal molecules are controlled by photochromic molecules formed on the substrate surface; the structural isomerization of photochromic molecules must be inclined the desirable portion of the substrate so that the tilt angles of the polymerized liquid crystal molecules are changed depending on the location within the retardation films. Therefore, the irradiation of linearly polarized light must have an irradiation intensity distribution on the plane of the substrate for producing the retardation film. However, it is considerably difficult to pattern the polarizing plate so as to create such intensity distribution.

Moreover, since the wavelength of light which induces polymerization of the polymerizable liquid crystal molecules and the wavelength of light which induces structural isomerization of the photochromic molecules are either the same or very close to each other, it is difficult to distinctly perform these two kinds of reactions. This makes it practically impossible to have the polymerization while the tilt angles of the polymerized liquid crystal molecules are held different depending on the location.

In a liquid crystal display device which has reinforcing members such as polymer columns or the like between the substrates constituting the liquid crystal panel, if a resist or a photopolymerizable material is used for forming the reinforcing members, the formed column or wall cannot have the same optical characteristics as the liquid crystal material. Therefore, when light is incident on the liquid crystal display device, the tone differs for light transmitted through the liquid crystal region and light transmitted through the polymer region. This makes it considerably difficult to control the tone for the entire expanse of the liquid crystal display device.

This phenomenon occurs because the polymer region is optically isotropic so that the tone created by the polarizing plates or the retardation films disposed on both sides of the liquid crystal panel appears as the tone of the polymer region without any change. This makes it difficult to control the tone for the panel. Moreover, such a coloring effect due to the polarizing plates or the like darkens the entire panel.

SUMMARY OF THE INVENTION

A retardation film made of a polymerized liquid crystal material of the present invention, includes: a first region having a first flat surface pattern; and a second region having a second flat surface pattern, wherein a thickness in the first region is different from that in the second region, thereby retardations in the first region and in the second region are different from each other.

In one embodiment of the present invention, a difference in the retardations between the first region and the second region is about 90 nm to about 800 nm.

According to one aspect of the present invention, a method for producing a retardation film includes the steps of: arranging a pair of substrates to face each other to form a gap therebetween; filling the gap with a polymerizable liquid crystal material; and polymerizing the polymerizable liquid crystal material, wherein at least one of the substrates has a surface on which a flat surface pattern including at least cone of a concavity and a convexity is formed, the substrates being arranged so that the surface having the flat surface pattern being in contact with the polymerizable liquid crystal material when the polymerizable liquid crystal material is filled, thereby a pattern corresponding to the flat surface pattern is formed on the polymerized liquid crystal material.

In one embodiment of the present invention, a method for producing a retardation film further includes a step of forming the flat surface pattern on the surface of the at least one of the substrates by using a resist material, prior to the step of arranging the substrates.

In another embodiment of the present invention, a method for producing a retardation film further includes a step of forming the flat surface pattern on the surface of the at least one of the substrates by using a dry film which is patternable by photolithography, prior to the step of arranging the substrates.

According to another aspect of the present invention, a retardation film formed of a polymerized liquid crystal material, includes: a first region having a first flat surface pattern; and a second region having a second flat surface pattern, wherein a tilt angle of liquid crystal molecules in the first region of the polymerized liquid crystal material is different from that in the second region, thereby retardations in the first region and in the second region are different from each other.

In one embodiment of the present invention, a difference in retardations between the first region and the second region is about 90 nm to about 800 nm.

According to still another aspect of the present invention, a method for producing a retardation film, includes the steps of: arranging a pair of substrates to face each other to form a gap therebetween; filling the gap with a polymerizable liquid crystal material; and polymerizing the polymerizable liquid crystal material, wherein, prior to the step of arranging the substrates, a thin film is selectively formed on a surface of at least one of the substrates. The thin film can be made of either one of a silane coupling agent and organic molecules having a thiol group or a disulfide bond. The substrates are arranged so that the surface having the thin film is in contact with the polymerizable liquid crystal material when the polymerizable liquid crystal material is filled, thereby making tilt angles of liquid crystal molecules in the polymerized liquid crystal material different between a region corresponding to a region where the thin film exists and a region corresponding to a region where the thin film does not exist.

According to still another aspect of the present invention, a liquid crystal display device having a display area, includes: a pair of substrates arranged to face each other; a liquid crystal region including liquid crystal material interposed between the pair of substrates, the liquid crystal region being arranged in the display area; a reinforcing member disposed between the pair of substrates to withstand a mechanical external force applied to the display area, the reinforcing member being made of a light transmitting polymer; and a retardation film made of a polymerized liquid crystal material and arranged along at least one of the substrates. The retardation film includes a first region and a second region whose retardations are different each other, the first region and the second region corresponding the liquid crystal region and the reinforce member, respectively.

In one embodiment of the present invention, a thickness in the first region of the retardation film is different from that in the second region.

In still another embodiment of the present invention, a tilt angle of polymerized liquid crystal molecules in the first region is different from that in the second region.

In still another embodiment of the present invention, the retardation film is disposed between the pair of substrates.

According to still another aspect of the present invention, a liquid crystal display device having a display region, includes: a pair of substrates arranged to face each other; a liquid crystal region including a liquid crystal material interposed between the pair of substrates, the liquid crystal region being arranged in the display area; and a reinforcing member disposed between the pair of substrates to withstand a mechanical external force applied to the display area. The reinforcing member is made of a light transmitting polymer. At least one of the pair of substrates includes a first region and a second region whose retardations are different each other, the first region and the second region corresponding the liquid crystal region and the reinforce member, respectively.

In one embodiment of the present invention, the at least one of the pair of substrates has a polymerized liquid crystal layer, the polymerized liquid crystal layer having thicknesses different between the first region and the second region.

In another embodiment of the present invention, the at least one of the pair of substrates has a polymerized liquid crystal layer, the tilt angle of liquid crystal molecules in the first region being different from that in the second region.

Thus, the invention described herein makes possible the advantages of (1) providing a retardation film having a structure where the retardation can be easily varied depending on the location and a method for producing the same, and (2) providing a liquid crystal display device which can avoid the phenomenon that the tone differs for the polymer region and the liquid crystal region having different optical characteristics for the display cell so that the tone of the entire display area can be easily controlled.

These and other advantages of the present invention will become apparent to those skilled in the art upon reading and understanding the following detailed description with reference to the accompanying figures.

BRIEF DESCRIPTION OF THE DRAWINGS

FIGS. 4A and 4B are views for describing a method for producing the retardation film according to Embodiment 2 shown in FIG. 3.

FIG. 11 is a graph illustrating a relationship between a difference in retardation between first and second regions of the retardation film of the present invention and luminosity L* of a liquid crystal display device.

DESCRIPTION OF THE PREFERRED EMBODIMENTS

Figure 1:
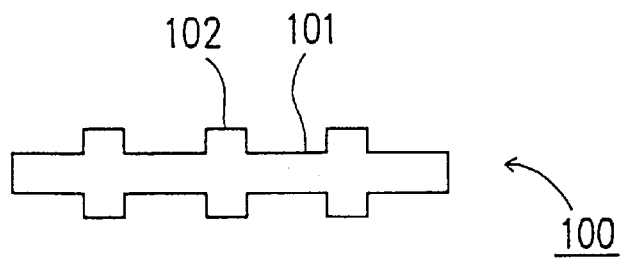
FIG. 1 is a cross-sectional view illustrating a structure of a retardation film according to Embodiment 1 of the present invention.

First, a fundamental principle of the present invention and the terms to be used in the description of the preferred embodiments will be briefly described.

(1) Retardation of the Retardation Film

When light advances in mediums having different refractive indices, a difference in the velocity of light results between them, resulting in phase difference. Specifically, when light having a wavelength $\lambda$ advances a thickness d within materials having refractive indices of n1 and n2, the resulting phase difference $\theta$ between the two light beams is given by $$\theta = 2\pi \cdot (n1-n2) \cdot d/\lambda, \text{ where } n1 > n2.$$

When light having a variety of wavelengths advances within a medium having birefringence like liquid crystal molecules, the degree of phase difference is expressed by the retardation R which is given by $$R = (n1-n2) \cdot d;$$

where n1 is a refractive index with respect to ordinary light and n2 is a refractive index with respect to extraordinary light.

In the present invention, concavities and convexities are provided on the surface of the retardation film so that values for the thickness d become different, thereby varying the retardation.

Moreover, if the tilt angle of the liquid crystal molecules is expressed by $\phi$, then the retardation R with respect to the tilt angle of the liquid crystal molecules oriented in the uni-axial direction is given by $$R = (n1-n2) \cdot d \cdot \cos^2 \phi;$$

where n1 is a refractive index with respect to ordinary light and n2 is a refractive index with respect to extraordinary light.

In the present invention, regions having different tilt angles of the liquid crystal molecules are selectively formed at arbitrary locations in the retardation film, thereby varying the retardation depending on the location within the retardation film.

(2) Polymerizable Liquid Crystal Materials

Polymerizable liquid crystal materials used in the present invention include a compound expressed by the following chemical formula;

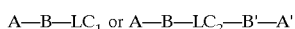

$$A—B—LC_1 \text{ or } A—B—LC_2—B'—A'$$

A and A' in the above chemical formula represent a polymerizable functional group. These are the functional groups having an unsaturated bond such as CH=CH—, CH=CH—COO—, CH=CCH$_3$—COO—, —N=C=O, etc. or a heterocyclic structure such as an epoxy group.

Moreover, B and B' represent a linking group which bonds the polymerizable functional group and the liquid crystal compound. Specifically, they represent a methylene chain, an ester group, an ether group or a combination thereof.

Furthermore, LC$_1$ and LC$_2$ represent a liquid crystal compound. As the liquid crystal compound, a molecule in which a plurality of phenyl groups, cyclohexyl groups, biphenyl groups or cyclohexylphenyl groups with a linking group such as —CH$_2$—CH$_2$—, —CH=CH—, —C≡C—, —COO—, etc. can be used.

(3) Method for Controlling the Tilt Angle of the Liquid Crystal Molecules by Organic Molecules According to a method for controlling the tilt angle of the liquid crystal molecules by organic molecules bonded to the substrate surface, molecules which undergo structural isomerization by light irradiation are used. Specifically, such molecules include a compound having an azobenzene skeleton, stilbene, α-hydrazone-β-keto-ester or the like. All have a common characteristic that when irradiated with linearly polarized light, a geometrical photoisomerism reaction takes place, resulting in a reversible change between structural isomers from a bar-shaped trans-form to a V-shaped cis-form.

It has also been reported that the tilt angle of the liquid crystal molecules with respect to the substrate changes depending upon a substitution group for azobenzene or the like, the spacer length or the silyl bonding manner. Generally, there is a tendency for the tilt angle to increase when the para position is substituted with a long chain alkyl group and to decrease when the chloro group, the methoxy group or the cyano group is used. As described above; since the tilt angle of the liquid crystal molecule is influenced by the structure of the molecules bonded to the substrate surface, the tilt angle of the polymerizable liquid crystal molecule in the region corresponding to the organic molecular layer formation can be varied by selectively forming the organic molecular layer on the substrate surface which comes in contact with the liquid crystal molecule.

(4) Method for Forming Organic Molecular Layer by a Silane Coupling Agent

The agent reacts with a glass surface, a SiO$_2$ or a substrate surface having metal oxide such as ITO layer surface and is used for surface modification.

In the preferred embodiments described below, the organic molecular layer is formed in the following conditions.

1. Concentration of the silane coupling agent is 0.1 wt % to 10 wt %, or preferably 0.5 wt % to 6 wt %.
2. A solvent capable of dissolving the silane coupling agent such as ethanol, chloroform, hexane, etc. is used as the solvent for the silane coupling agent.

3. Processing temperature during formation of the organic molecular layer is 0° C. to 60° C., or preferably 4° C. to 25° C.

4. Reaction time for forming the organic molecular layer is 30 minutes to 48 hours, or preferably 1 hour to 24 hours. If necessary, the substrate can further be washed with the solvent used, thereby removing the unreacted silane coupling agent remaining.

(5) Method for Forming an Organic Molecular Layer of a Compound Including a Thiol Group and Disulfide Bond by Self-assembly A phenomenon that an organic compound including sulfur atoms such as a thiol group or disulfide group peculiarly bonds to Au atoms or the like has been observed. This phenomenon is called self-assembly. In the present invention, this peculiar bond is used to form an organic molecular layer on the patterned thin film made of Au atoms.

First, Au atoms are deposited on a substrate by sputtering or the like to form a Au thin layer. Its thickness is such that it uniformly covers the area where the thin film is intended to be formed. If necessary, a metal deposition film such as a chromium layer can be formed prior to the formation of the Au thin layer in order to improve the adhesiveness of the Au thin layer to the substrate.

Next, an organic compound including sulfur atoms is dissolved in a solvent such as absolute ethernol, and the concentration is adjusted to those mentioned below. Those other than absolute ethernol can be used as a solvent if it does not oxidize the above-mentioned compound to form a dimer.

Then, the substrate on which the Au thin layer is formed is immersed in this solution, and the organic compound with the sulfur atoms is self-assembled to the region of the substrate deposited with Au.

Detailed conditions for these processes are as follows.

1. Concentration of the compound including sulfur atoms is 0.1 wt % to 10 wt %, or preferably 0.5 wt % to 6 wt %.

2. Process temperature during the formation of the organic molecular layer on the Au thin layer is 0° C. to 40° C., or preferably 4° C. to 10° C.

3. Reaction time for forming the organic molecular layer on the Au thin layer is 30 minutes to 48 hours, or preferably 1 hour to 24 hours.

After the reaction, if necessary, the substrate can be washed with the solvent used, thereby removing the portion of the organic molecular layer absorbed on the substrate surface in a non-self-assembling manner.

(6) Method for Patterning the Deposition Film by Lift-off Method

In a lift-off method, the order of the formation of the resist pattern and the deposition of the material layer is reversed compared with that of an ordinary patterning method using a resist layer. By depositing the material layer on the entire surface of the resist layer having a predetermined pattern, and then by removing the resist layer, the portion of the material layer deposited on the resist layer can be removed together with the resist layer. The principle of lift-off method is to use cracks formed in the material layer on the periphery of the resist layer due to the imperfection of the coverage of the material over the resist layer. The resist peeling solution enters through these cracks in the material layer so that the resist layer can be expanded and dissolved. Required thickness of the resist layer for the cracks to be formed in the material layer is twice the thickness of the deposition film or greater.

Hereinafter, preferred embodiments of the present invention will be described. However, the present invention is not limited by these embodiments described below.

Embodiment 1

Figure 2:
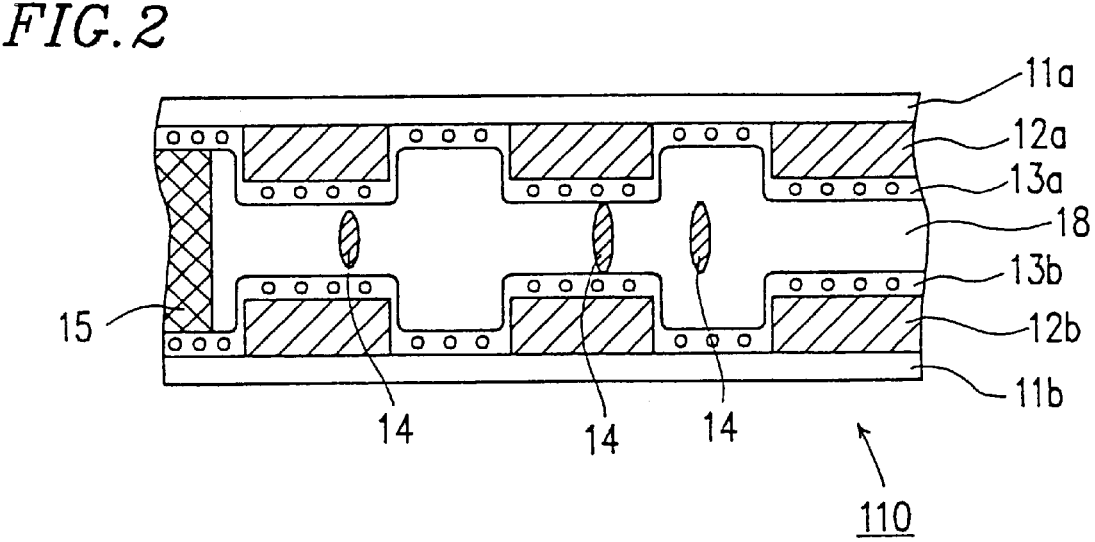
FIG. 2 is a cross-sectional view for describing a method for producing the retardation film shown in FIG. 1.

FIG. 1 is a cross-sectional view illustrating a structure of a retardation film according to Embodiment 1 of the present invention. FIG. 2 is a cross-sectional view for describing a method for producing the above-mentioned retardation film.

As shown in FIG. 1, a retardation film 100 has first regions (concavities) 101 having a first flat surface pattern and second regions (convexities) 102 having a second flat surface pattern and having a thickness greater than that of the first regions. In the retardation film 100 having such structure, the retardation differs for the concavity 101 and the convexity 102.

A method for producing the retardation film having such structure will be described with reference to FIG. 2.

First, a liquid resist resin, for example, is applied on a pair of substrates 11a and 11b for forming the retardation film. Then, after the exposure by selective irradiation of light through a mask or the like, the development is performed so as to form resist layers 12a and 12b having prescribed patterns. The above-mentioned substrates 11a and 11b are made of a glass plate or the like.

Next, alignment layers 13a and 13b are formed on these patterned resist layer 12a and 12b, respectively. Then, the alignment layers are rubbed with a rubbing fabric. During these processes, since there is a step between the regions of the substrate surface where the resist layers 12a and 12b remain and where the resist layers are removed, the surface of the alignment layers 13a and 13b has concavities and convexities corresponding to these steps.

Such treatment for forming concavities and convexities on the substrate surface can also be performed by a method for patterning a photosensitive film such as a dry film, an inorganic layer such as $SiO_2$, ITO (a mixture of indium oxide and tin oxide) or the like, or a metal layer such as Au, Al, Mo, Ag, Cu or the like as well as by a method for patterning an organic thin film such as a resist.

The above-mentioned dry film is kept as a roll. Therefore, if a plastic film which is also kept as a roll is to be used as a substrate material, the dry film and the plastic film can be continuously brought together while drawing them from their respective rolls. The dry film and the plastic film brought together as such are subsequently processed into predetermined dimensions to be used as a substrate of the retardation film. Accordingly, the above-mentioned formation of the concavities and convexities on the substrate surface can be performed with better workability by using the dry film than in a method where the resist or the like is coated as the organic thin film on the individual substrate processed into predetermined dimensions.

Alternatively, the concave-convex structure on the substrate surface can be formed by selectively eroding away the surface of the glass substrate with fluoric acid or the like or by forming the plastic substrate in a metal mold having an arbitrary concave-convex structure.

The pair of substrates whose surfaces are processed as described above are put together with a seal material 15 in such a manner that the rubbing directions of respective substrates are the same if the orientations of the liquid crystal molecules are aligned along one axis and that the rubbing directions form a necessary angle if liquid crystal molecules are to be twisted. In this way, a cell 110 for forming the retardation film is obtained. If necessary, spacers 14 are dispersed before the substrates are put together.

Here, both substrates 11a and 11b are processed so that the surfaces thereof have the concavities and convexities. However, it is only necessary that such surface processing be performed at least to one of the substrates. In that case, the step of forming the resist layer can be omitted for one of the substrates which is not to be processed for concavities and convexities on the surface.

Then, a mixed material 18 including at least a photopolymerizable liquid crystal material and a photopolymerization initiator is injected into the gap between the pair of substrates 11a and 11b obtained as above.

Any liquid crystal material can be used as the photopolymerizable liquid crystal material as long as polymerization is initiated by light irradiation. For example, a liquid crystal material to which an acrylic group is attached as illustrated in chemical formula (1) below can be used.

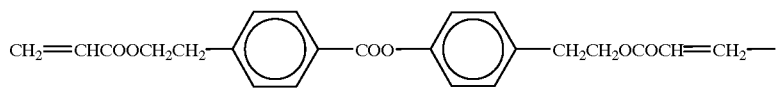

(1)

Polymerizable liquid crystal materials having such characteristics can be used alone or in combination. When liquid crystal molecules are to be twisted in the polymerized liquid crystal material, the chiral agent can be used if necessary. As the chiral agent, S-811 (manufactured by Merck & Co., Ltd.) can be used. Furthermore, as the photopolymerization initiator Irgacure 651 (manufactured by Ciba Geigy Corporation) can be used. The injection hole is sealed with a resin or the like. However, when an UV curable resin is used as the sealing material, it is necessary to radiate UV light in such a manner that the UV light is not incident on the region where the polymerizable liquid crystal material is injected. Moreover, it is effective to use a two component curable resin which does not require the irradiation of UV light for the curing process or an instantaneous adhesive agent which cures when it makes contact with air as a sealing resin for the above-mentioned injection hole.

Next, the polymerizable liquid crystal material is cured by irradiating the above-mentioned cell 110 from outside with UV light or the like. The retardation film 100 produced thereby can be used while interposed between the substrates, or, if necessary, the retardation film 100 can be taken out of the pair of substrates by peeling the seal material 15 and used.

EXAMPLE 1

Hereinafter, an example of specific construction of the retardation film in Embodiment 1 will be described as Example 1. In Example 1, the description will be given of the case where a resist layer is used in order to form the concave-convex structure on the substrate surface.

As the above-mentioned substrates 11a and 11b, 7059 glass (manufactured by Corning Inc.) is used. A positive type photoresist (OFPR-800, manufactured by Tokyo Ohka Kogyo Co., Ltd.) was applied onto the substrates 11a and 11b to a film thickness of 1 μm, and then was patterned by photolithography so that the resist layer 12a and 12b were left in a bank shape. Next, alignment layers 13a and 13b (S-150, manufactured by Nissan Chemical Industries, Ltd.) were respectively formed on the resist layers 12a and 12b to a thickness of 500 angstroms, and uni-directional rubbing was performed on the alignment layers with a nylon fabric.

The substrates 11a and 11b produced as above were arranged in such a manner that the surfaces thereof having the concavity-convexity structure were facing each other and that the rubbing directions thereof were matched with an arbitrary twist angle. Furthermore, if necessary, the spacers 14 were dispersed, and the substrates were put together with the seal material 15 at the edge of the substrates, thereby forming the cell 110 for producing the retardation film.

The polymerizable liquid crystal material of the above chemical formula (1) and the polymerization initiator (Irgacure 651, produced by Ciba Geigy Corporation) were injected into the gap between the substrates 11a and 11b of the forming cell 110. Then, by polymerizing the polymerizable liquid crystal material by irradiation of UV light, the retardation film was produced.

Consequently, the concave-convex configuration obtained by inverting the concave-convex structure on the substrate surface patterned by the resist layer was formed on the surface of the retardation film 100 produced as above.

Alternatively, a concave-convex structure similar to that mentioned above was formed on the retardation film by using a photosensitive film such as a dry film, an inorganic layer such as a $SiO_2$ layer an ITO layer and the like, or a metal layer such as Au, Al, Mo, Ag, Cu or the like; by selectively eroding away portions of the surface of the glass substrate with fluoric acid or the like; or by forming the plastic substrate in a metal mold having the concave-convex structure. When the concave-convex structure is formed on the retardation film by a metal layer which decreases the amount of transmitted UV light, if UV light intensity sufficient for the polymerization of the polymerizable liquid crystal material to take place is not obtained, then it is acceptable that the metal layer is formed only on one of the substrates and the UV light is irradiated from the side where the metal layer is not formed.

When the surface of the retardation film was observed under an atomic force microscope (SFA 300, manufactured by Seiko Instruments Inc.), the height of the step between the concavity and the convexity was 1 μm. This confirmed that the step due to the resist layer was reproduced on the retardation film.

Embodiment 2

Next, a retardation film and a method for producing the same according to Embodiment 2 of the present invention will be described.

Figure 3:
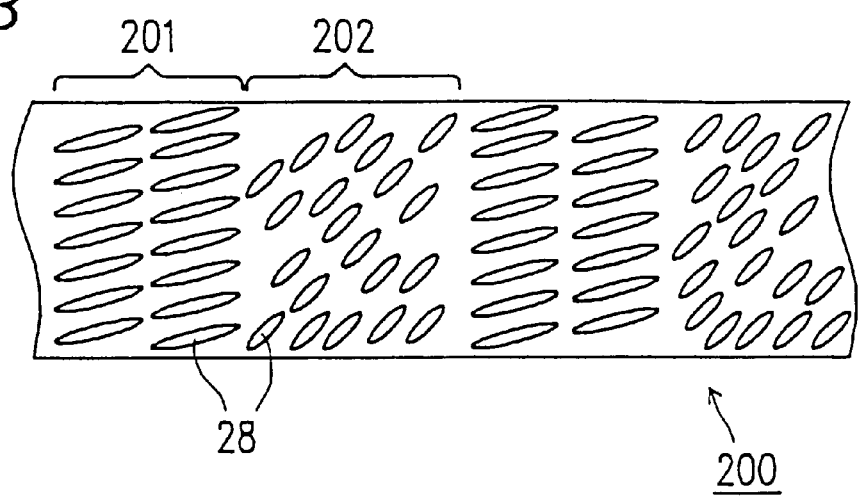
FIG. 3 is a schematic view illustrating a structure of a retardation film according to Embodiment 2 of the present invention.

FIG. 3 schematically illustrates a structure of the retardation film of Embodiment 2. The retardation film 200 includes a layer of a polymerized liquid crystal material and has a region 201 where the tilt angle of the liquid crystal molecules 28 of the polymerized liquid crystal material is low and a region 202 where the tilt angle of the liquid crystal molecules 28 is high. The retardation in the retardation film differs for the regions 201 and 202.

Next, a method for producing the retardation film will be described with reference to FIGS. 4A and 4B.

First, alignment layers 22a and 22b are formed on the substrates 21a and 21b made of it glass plate or the like. Then, for underlying layers 23a and 23b, oxide films such as a $SiO_2$ layer an ITO layer or the like, or metal layers such as Au, Al, Ag, Cu or the like, are formed thereon by sputtering for organic molecular thin films 24a and 24b to be described later.

Next, a material, which can be patterned by photolithography, such as a resist or a dry film, is applied on or attached to the underlying layers 23a and 23b, and resist layers 25a and 25b having a predetermined pattern are formed by exposure and development. If the previously formed underlying layers 23a and 23b are oxide films such as the $SiO_2$ layer then the substrates processed as above are immersed in an ethanol solution containing 5 wt % of the silane coupling agent such as octadecyltrichlorosilane, so that the organic molecular layers 24a and 24b are formed. Alternately, if the underlying layers are metal layers such as the Au layer, then the substrates are immersed in the ethanol solution containing 5 wt % of organic molecules having sulfur atoms (SH group or disulfide bond) such as octadecylthiol, so as to form the organic molecular layers 24a and 24b. In these processes, the organic molecular layers 24a and 24b are formed only on the portion of the underlying films 23a and 23b made of the oxide film or the metal layer exposed at the opening of the resist layer (FIG. 4A).

Next, the resist layers 25a and 25b are removed, and then the surfaces of the substrates where the organic molecular layers 24a and 24b are formed are rubbed with a nylon fabric or the like.

The substrates 21a and 21b produced as above are put together with the seal material 27 on the edge of the substrates, with spacers 26 being dispersed, if necessary, in such a manner that the surfaces on which the organic molecular layers are formed are facing to each other as in Embodiment 1 described above. This completes the formation of the cell 120 for forming the retardation film.

Next, a polymerizable liquid crystal material 28 similar to that described in Embodiment 1 is injected into the gap between the substrates 21a and 21b and is polymerized, so as to produce the retardation film 200 in a method similar to that in Embodiment 1 (FIG. 4B).

Since the surface condition differs for the regions of the substrates 21a and 21b, where the organic molecular layers 24a and 24b are formed and where these organic molecular layers are not formed, the tilt angle of the liquid crystal molecules with respect to the substrate can be varied.

EXAMPLE 2

Hereinafter, an example of a specific structure of the retardation film in Embodiment 2 will be described.

In Example 2, the description will be given of the case where the organic molecular layers 24a and 24b are formed of octadecyltrichlorosilane with reference to FIGS. 4A and 4B.

Alignment layers 22a and 22b (S-150, manufactured by Nissan Chemical Industries, Ltd. were respectively formed on a pair of transparent glass substrates 21a and 21b (7059, manufactured by Corning Inc.) to a thickness of 500 angstroms. Then, $SiO_2$ layer were deposited as underlying films 23a and 23b on these alignment layers by sputtering to a thickness of 200 angstroms. Next, a positive type photoresist (OFPR-800, manufactured by Tokyo Ohka Kogyo Co., Ltd.) was applied on these deposited films 23a and 23b to a film thickness of 1 μm, and then was patterned by photolithography so that the resist layer 25a and 25b were left in a bank shape.

Next, organic molecular layers 24a and 24b were formed with a silane coupling agent on the substrates 21a and 21b whose surfaces were processed as above in the following manner.

The substrates having a resist pattern on the surface were immersed in an ethanol (manufactured by Wako Pure Chemical Industries, Ltd.) solution containing 5 wt % of octadecyltrichlorosilane (manufactured by Tokyo Chemical Industries, Ltd.). The immersion time was 1 hour and the temperature was maintained at 10° C. throughout the immersion process. Next, the resist layers 25a and 25b on the substrate surfaces were removed by an aqueous solution of 2% NaOH and, then unidirectional rubbing was performed with a nylon fabric.

The substrates 21a and 21b produced as above were arranged in such a manner that the surfaces on which the organic molecular layers were formed were facing each other and that the rubbing directions thereof were matched with an arbitrary twist angle. Furthermore, if necessary, the spacers 26 were dispersed, and the substrates were put together with the seal material 27, thereby forming the cell 120 for producing the retardation film.

Then, the polymerizable liquid crystal material 28 given by the above-mentioned chemical formula (1) and the polymerization initiator (Irgacure 651, manufactured by Ciba Geigy Corporation) were injected into the gap between the substrates produced as described above, and UV light was irradiated to polymerize the polymerizable liquid crystal material 28.

The tilt angle of the liquid crystal molecules in the polymerized liquid crystal material of the retardation film 200 produced as above was measured by a tilt angle measuring apparatus (NSMAP. 3000 LCD, manufactured by Sigma Optics). The result was as follows. The tilt angle was 60° in the region of the substrate where the organic molecular layer was formed, and the tilt angle was 4° in the region where the organic molecular layer was not formed. As above, the tilt angle of the polymerized liquid crystal molecule could be varied by selectively arranging the organic molecular layer on the substrate.

EXAMPLE 3

Next, another example of a specific structure of the retardation film in Embodiment 2 will be described as Example 3.

In Example 3, the description will be given of the case where the above-mentioned octadecylthiol with reference to FIGS. 4A and 4B.

Alignment layers 22a and 22b (S-150, manufactured by Nissan Chemical Industries, Ltd.) were formed on a pair of transparent glass substrates; 21a and 21b (7059, manufactured by Corning Inc.) to a thickness of 500 angstroms. Then, Au layers were deposited on these alignment layers by sputtering to a thickness of 200 angstroms as underlying films 23a and 23b. Next, a positive type resist (OFPR-800, manufactured by Tokyo Ohka Kogyo Co., Ltd.) was applied on these deposited films 23a and 23b to a film thickness of 1 μm and was patterned by photolithography so that the resist layers 25a and 25b remained in a bank shape.

Next, organic molecular layers 24a and 24b were self-assembled on the substrates processed as above, in the following manner.

The substrates 21a and 21b having a concave-convex configuration formed on the surfaces described as above were immersed in an ethanol (manufactured by Wako Pure Chemical Industries, Ltd.) solution containing 5 wt % of octadecylthiol (manufactured by Tokyo Chemical Industries, Ltd.). The immersion time was 1 hour and the temperature was maintained at 10° C. throughout the immersion process. Next, the resist layers 25a and 25b were removed by an aqueous solution of 2% NaOH and, then, unidirectional rubbing was performed with a nylon fabric.

The substrates 21a and 21b produced as above were arranged in such a manner that the surfaces on which the organic molecular layers were formed were facing to each other and the rubbing directions were matched with an arbitrary twist angle. Furthermore, if necessary, spacers 26 were dispersed, and the substrates 21a and 21b were put together with a seal material 27, thereby completing the cell 120 for producing the retardation film.

The polymerizable liquid crystal material given by the above chemical formula (1) and the polymerization initiator (Irgacure 651, manufactured by Ciba Geigy Corporation) were injected into the gap between the substrates of the cell 120 produced as above, and UV light was irradiated so as to polymerize the polymerizable liquid crystal material.

The tilt angle of the polymerized liquid crystal molecules of the retardation film 200 produced as above was measured by a tilt angle measuring apparatus (NSMAP. 3000 LCD, manufactured by Sigma Optics). The result was as follows. The tilt angle was 63° in the region of the substrate surface where the organic molecular layer was formed, and the tilt angle was 4° in the region where the organic molecular layer was not formed.

As described above, the tilt angle of the liquid crystal molecules of the polymerized liquid crystal material could be varied by selectively arranging the organic molecular layer on the substrate.

Embodiment 3

Next, a retardation film and a method for producing the same according to Embodiment 3 of the present invention will be described.

The retardation film in Embodiment 3 is also such that the tilt angle of liquid crystal molecule of the polymerized liquid crystal material constituting the retardation film is varied as in the retardation film 200 in Embodiment 2 illustrated in FIG. 3.

Figure 5A:
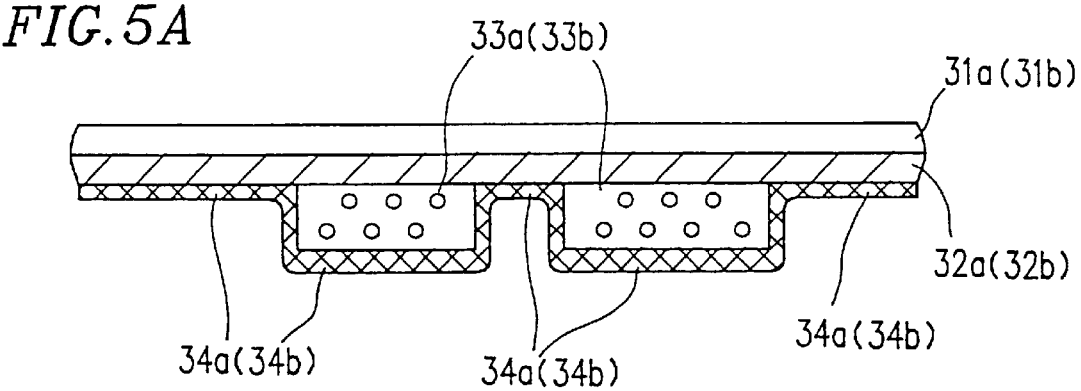
FIGS. 5A and 5B are views for describing a retardation film according to Embodiment 3 of the present invention and a method for producing the same.
Figure 5B:
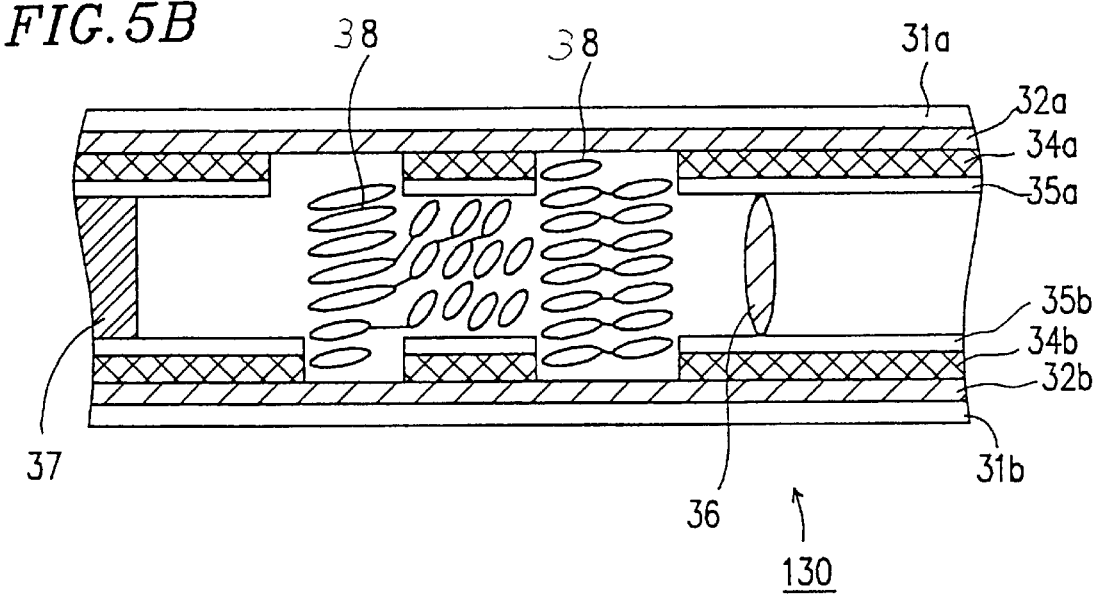

Hereinafter, a method for forming the retardation film in Embodiment 3 will be described with reference to FIGS. 5A and 5B.

First, alignment layers 32a and 32b are formed on the substrates 31a and 31b made of a glass plate or the like. Next, a material which can be patterned by photolithography, such as a resist or a dry film is applied or attached thereon, and resist layers 33a and 33b having a predetermined pattern are formed by exposure and development. Next, an oxide film such as $SiO_2$ or ITO, or a metal layer such as Au, Ag, Al, Cu or the like is deposited by sputtering on the resist layers 33a and 33b having the predetermined pattern as underlying films 34a and 34b for the organic molecule thin film to be described later (FIG. 5A). In the case where the underlying films 34a and 34b are formed of Au, the Au layers may be deposited after Cr films on the resist layers 33a and 33b.

Next, the substrates 31a and 31b are immersed in a solvent which can dissolve a resist such as acetone, and the underlying films 34a and 34b are patterned by lift-off. If the underlying films 34a and 34b are the $SiO_2$ layer, then the substrates 31a and 31b are immersed in an ethanol solution containing 5 wt % of the silane coupling agent such as octadecyltrichlorosilane, and if the underlying films 34a and 34b are the Au layers, then the substrates 31a and 31b are immersed in the ethanol solution containing 5 wt % of organic molecules having sulfur atoms (SH group or disulfide bond) such as octadecylthiol, so that organic molecular layers 35a and 35b are formed. In these processes, the organic molecular layers 35a and 35b are formed only on the portion of the substrates where the $SiO_2$ layer or the Au layers exist.

Next, after removing the resist layers, the surfaces of the substrates 31a and 31b where the organic molecular layers 35a and 35b are formed are rubbed.

Then, as in Embodiment 1, the substrates produced as above are put together with the seal material 37 at the edge of the substrates in such a manner that the surfaces where the organic molecular layers are formed are facing to each other. When the substrates are put together, spacers 36 are dispersed if necessary. This completes a cell 130 for forming the retardation film.

Next, the polymerizable liquid crystal material 38 similar to the one illustrated in Embodiment 1 is injected into the gap between the pair of substrates 31a and 31b constituting the cell 130. Then, the polymerizable liquid crystal material 38 is polymerized so that the retardation film is produced in a manner similar to Embodiment 1.

Since the surface conditions are different for the regions of the substrate surfaces, where the organic molecular layer is formed and where the organic molecular layer is not formed, the tilt angle of the liquid crystal molecules with respect to the substrate can be varied among these regions.

As described above, the tilt angle of the liquid crystal molecules of the polymerized liquid crystal material interposed between the substrates can be varied by selectively arranging the organic molecular layers on the opposing surfaces of the pair of substrates.

As in Embodiment 1 previously described, the above retardation film can be taken out of the forming cell 130 for use. In that case, the organic molecular layers 35a and 35b as well as the substrates 31a and 31b of the forming cell 130 are removed from the retardation film. Although a step due to the organic molecular layer is formed on the surface of the retardation film, since the thickness of the organic molecular layer is as small as about 1/100 of the total thickness of the retardation film, the step on the surface of the retardation film is negligible.

EXAMPLE 4

Next, an example of the specific structure of the retardation film in Embodiment 3 will be described as Example 4.

The description will be given of the case where the organic molecular layers 35a and 35b are formed of octadecyltrichlorosilane in Embodiment 3.

Alignment layers 32a and 32b (S-150, manufactured by Nissan Chemical Industries, Ltd.) were formed on a pair of transparent glass substrates 31a and 31b (7059, manufactured by Corning Inc.) to a thickness of 500 angstroms. Next, a positive type resist (OFPR-800, manufactured by Tokyo Ohka Kogyo Co., Ltd.) was applied on these alignment layers to a thickness of 1 $\mu$m and was patterned by photolithography so that the resist layers 33a and 33b remained in a bank shape.

Then, $SiO_2$ layer were deposited as underlying films 34a and 34b on the resist layers 33a and 33b by sputtering to a thickness of 200 angstroms. Next, the substrates 31a and 31b were immersed in acetone (manufactured by Wako Pure Chemical Industries, Ltd.), and the resist layers were removed together with the $SiO_2$ layer deposited on the resist layer by lift-off so that the $SiO_2$ layer were patterned.

Then, organic molecular layers 35a and 35b were formed on the substrates 31a and 31b using a silane coupling agent in the following manner.

First, the substrates 31a and 31b having the $SiO_2$ layer selectively formed on the surfaces were immersed in an ethanol (manufactured by Wako Pure Chemical Industries, Ltd.) solution containing 5 wt % of octadecyltrichlorosilane (manufactured by Tokyo Chemical Industries, Ltd.). The immersion time was 1 hour and the temperature was maintained at 10° C. throughout the immersion process. Then, the surfaces of the substrates 31a and 31b were subjected to uni-directional rubbing with a nylon fabric.

The substrates produced as above were arranged in such a manner that the surfaces where the organic molecular layers were formed were facing to each other and that the rubbing directions were matched with an arbitrary twist angle. Furthermore, spacers 36 were dispersed if necessary, and the substrates were put together with the seal material 37, thereby forming a cell 130 for forming the retardation film.

Then, the polymerizable liquid crystal material 38 given by the chemical formula (1) and a polymerization initiator (Irgacure 651, manufactured by Ciba Geigy Corporation) were injected into the gap between the substrate of the cell 130 formed as above, and UV light was irradiated so as to polymerize the polymerizable liquid crystal material.

The tilt angle of the polymerized liquid crystal molecules of the retardation film produced as above was measured by a tilt angle measuring apparatus (NSMAP. 3000 LCD, manufactured by Sigma Optics). The result was as follows. The tilt angle was 59° in the region of the substrate where the organic molecular layer was formed, and the tilt angle was 4° in the region where the organic molecular layer was not formed.

As described above, the tilt angle of the liquid crystal molecules could be varied depending on the location by selectively providing the organic molecular layers on the surface of the substrate for forming the retardation film.

EXAMPLE 5

Next, another example of the specific structure of the retardation film in Embodiment 3 will be described as Example 5. The description will be given of the case where the organic molecular layers 35a and 35b were formed of octadecylthiol in Embodiment 3.

Alignment layers 32a and 32b (S-150, manufactured by Nissan Chemical Industries, Ltd.) were respectively formed on a pair of transparent glass substrates 31a and 31b (7059, manufactured by Corning Inc.) to a thickness of 500 angstroms. Next, a positive type resist (OFPR-800, manufactured by Tokyo Ohka Co., Ltd.) was applied on the alignment layers to a thickness of 1 μm and was patterned by photolithography so that the resist layers 33a and 33b remained in a bank shape.

Then, Au layers were deposited on the resist layers 33a and 33b to a thickness of 200 angstroms as underlying films 34a and 34b.

Next, the substrates 31a and 31b were immersed in acetone (manufactured by Wako Pure Chemical Industries, Ltd.), and the resist layers were removed by lift-off together with the Au layers deposited on the resist layers, so that the Au layers were patterned.

Then, organic molecular layers 35a and 35b were respectively formed on the substrates 31a and 31b by self-assembly in the following manner.

The substrates 31a and 31b having the organic molecular layers 35a and 35b selectively formed on the surfaces were immersed in an absolute ethanol (manufactured by Wako Pure Chemical Industries, Ltd.) solution containing 5 wt % of octadecylthiol (manufactured by Tokyo Chemical Industries, Ltd.). The immersion time was 12 hours and the temperature was maintained at 4° C. throughout the immersion process.

After being taken out of the solution, the substrates were washed with the above-mentioned ethanol. After being dried, the substrates were subjected to uni-directional rubbing with a nylon fabric.

The two substrates produced as above were arranged in such a manner that the surfaces on which the organic molecular layers 35a and 35b were formed were facing to each other and that the rubbing directions were matched with an arbitrary twist angle. Furthermore, spacers 36 were dispersed if necessary, and the substrates were put together with the seal material 37, thereby forming a cell 130 for forming the retardation film.

Then the polymerizable liquid crystal material 38 given by chemical formula (1) and the polymerization initiator (Irgacure 651, manufactured by Ciba Geigy Corporation) were injected into the gap between the substrates of the cell 130 formed as above, and UV light was irradiated so as to polymerize the polymerizable liquid crystal material 38.

The tilt angle of the polymerized liquid crystal molecules of the retardation film produced as above was measured by a tilt angle measuring apparatus (NSMAP. 3000 LCD, manufactured by Sigma Optics). The result was as follows. The tilt angle was 65° in the region of the substrate where the organic molecular layers were formed, and the tilt angle was 4° in the region of the substrate where the organic molecular layers were not formed.

As above, the retardation film with the tilt angle of the liquid crystal molecules of the polymerized liquid crystal material being different depending on the location could be obtained by selectively arranging the organic molecular layer on the surface of the substrate for forming the retardation film.

Embodiment 4

Next, a liquid crystal display device according to Embodiment 4 will be described.

Figure 6:
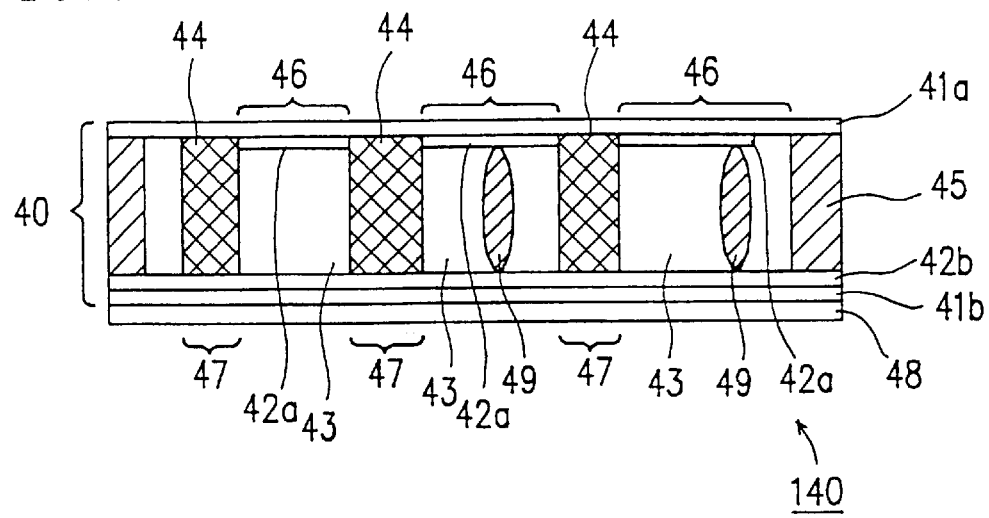
FIG. 6 is a cross-sectional view illustrating a structure of a liquid crystal display device according to Embodiment 4 of the present invention.

FIG. 6 is a cross-sectional view illustrating the structure of the liquid crystal display device 140 in the present embodiment. The liquid crystal display device 140 includes a retardation film 48 having selectively formed regions of different retardations.

The liquid crystal display device 140 is a simple matrix type, where a plurality of electrodes 42a and 42b having a band shape are formed on the opposing surfaces, respectively, of a pair of transparent substrates 41a and 41b. A liquid crystal layer is interposed between the substrate 41a and 41b. The electrodes 42a and 42b are arranged to cross each other.

The portion where the electrodes 42a and 42b cross each other are the pixel regions 46. The pixel region 46 includes a liquid crystal region 43 where a liquid crystal material fills the space. In the non-pixel region 47, which is the region between the two substrates other than the pixel region 46, polymer walls 44 are arranged so as to enclose the liquid crystal region 43. Moreover, the retardation film 48 is disposed on the outer surface of one of the substrates (substrate 41b in FIG. 6) in such a manner that the retardation differs in the regions of the retardation film 48 corresponding to the liquid crystal region 43 and the polymer wall 44. Furthermore, although not shown in FIG. 6, insulating layers and alignment layers may be provided on the electrodes 42a and 42b.

The pair of substrates 41a and 41b are put together with the seal material 45 on their edges, as shown in FIG. 6. Spacers 49 are provided between the two substrates 41a and 41b in order to regulate the gap therebetween.

Next, a method for producing the above-mentioned liquid crystal display device 140 will be described.

First, an ITO layer is deposited on each of the substrates 41a and 41b to a thickness of 2000 angstroms by, for example, sputtering. The ITO layers are then patterned to form the band shape electrodes 42a and 42b. As a material for the above-mentioned substrate, any material can be used as long as at least one of the substrates transmit light such as glass, plastic film and the like. Moreover, if one of the substrates is transparent, then the other substrate may be a substrate provided with non-transparent metal layer thereon.

Next, an electrical insulating layer (not shown) is formed by sputtering so as to cover the transparent electrode on each substrate. Then, an alignment layer (not shown) is further formed thereon, and the alignment layer is rubbed with a nylon fabric. However, the electrical insulating layer and the alignment layer are not necessarily required, and can be omitted depending on the situation.

The substrates 41a and 41b processed as above are arranged to face each other in such a manner that the transparent electrodes 42a and 42b perpendicularly cross each other. Spacers 49 are dispersed between the two substrates, and the substrates 41a and 41b are put together with the seal material 45 on the edges, thereby producing a liquid crystal cell 40 for a display.

Then, a display medium is injected into the gap between the substrates of the cell 40 for a display obtained as above. The display medium is injected through an injection hole (not shown) of the cell 40. Here, the mixture of at least a liquid crystal material, a polymerizable material and a photopolymerization initiator is injected as the display medium, and the liquid crystal material and the polymerizable material conduct the phase separation.

As a liquid crystal material described above, any of liquid crystal materials can be used which are used in a liquid crystal display device such as conventional TN mode, STN mode, ECB mode, ferroelectric liquid crystal display mode, light scattering mode, etc.

A liquid crystal material for STN mode such as ZLI-4427 added with 3% of the chiral agent S-811 (both manufactured by Merck and Co., Ltd.), or the like can be used. As the polymerizable material, any of those which polymerize and become cured by light irradiation such as isobornylmetacrylate, p-phenylstylene (both manufactured by NIPPON KAYAKU co., Ltd.) or the like can be used. The polymerizable materials can be used alone or in combination thereof. Furthermore, the mixture may contain a polymerization initiator. As the photopolymerization initiator, Irgacure 651 (manufactured by Ciba Geigy Corporation) can be used. The injection hole of the display cell 40 is sealed with a resin or the like. However, if an UV light curable resin is to be used for sealing, then it is necessary to irradiate UV light in such a manner that the UV light is not incident on the region to which the mixed material is injected. Moreover, it is effective to use a two component curable resin which does not require the irradiation of UV light in the curing process or an instantaneous adhesive agent which is cured when it makes contact with air as a sealing resin for the above-mentioned injection hole.

Next, light such as UV light is irradiated on the above-mentioned mixed material from the outside of the display cell 40. In doing so, treatment is performed to the substrate of the light irradiation side such that the energy intensity, such as the amount of transmitted light, becomes smaller in the liquid crystal regions 43 than in other regions of the substrate.

In the case of UV light irradiation, a transmitted light amount distribution is selectively created by blocking the light with a photomask or by absorbing the UV light by a metal layer such as ITO, an inorganic layer or an organic layer. As the light source, a high pressure mercury arc lamp for irradiating with parallel UV light can be used. The irradiating position can be chosen arbitrarily. For example, the irradiation is performed at such position that the irradiation intensity on the substrate surface becomes 10 mW/cm$^2$.

By selectively creating the energy intensity distribution, the mixed material injected into display cell 40 experiences phase separation so that liquid crystal regions and polymer regions are formed. When the UV light irradiation is performed while the substrate temperature is kept high in order to stabilize the orientation of liquid crystal molecules, it is desirable to slowly cool down the inside of the cooling oven to room temperature or other low temperature (0° C. or below). Moreover, after the phase separation, in order to improve the cross-linkage of the polymers, further energy may be supplied by UV light irradiation or the like at the room temperature or low temperature (0° C.).

In another method for forming a liquid crystal cell of the liquid crystal display device 140, walls made of the resist layer are formed in the non-electrode region (regions other than where the electrodes are formed) of one of the substrate by photolithographic treatment using a resist or a photosensitive resin. Here, as the resist material, OFPR-800 (manufactured by Tokyo Ohka Kogyo Co., Ltd.) can be used. Furthermore, the above-described liquid crystal material such as ZLI-4427 added with 3% of the chiral agent S-811 (both manufactured by Merck & Co., Ltd.) is dropped on the surface of one of the substrates. Then, the substrates are put together with the seal material in such a manner that the electrodes on one of the substrates cross the electrodes on other substrate. Spacers are dispersed between the substrates if necessary. As a result, the structure where the liquid crystal regions 43 and the polymer regions 44 are selectively formed at arbitrary positions is formed between the two substrates 41a and 41b. Here, polymer material is located in the non-pixel region and liquid crystal material is located in the pixel region.

Then, the retardation film 418 is disposed on one of the substrates (41b in FIG. 6) of the liquid crystal cell 40 produced as described above. As the retardation film 48, one of those described in Embodiments 1 to 3 previously described is used. Moreover, the retardation of the retardation film 48 is adjusted such that the retardations are different in the regions corresponding to the polymer walls 44 and to the liquid crystal regions 43 of the display cell 40. Moreover, the film thickness of the retardation film 48 and the tilt angles of the polymerizable liquid crystal molecules are determined such that a color reproduced when no voltage is applied is the closest to white in the case where the liquid crystal display 140 operates in normally white mode.

EXAMPLE 6

Next, an example of the specific structure of the liquid crystal display device of Embodiment 4 will be described as Example 6. A simple matrix type liquid crystal display device using an STN liquid crystal material as a display medium will be described in Example 6 with reference to FIGS. 6 and 7.

As a pair of substrates 41a and 41b which constitute display cell 40, 7059 glass (manufactured by Corning Inc.) is used. Then, ITO layers are deposited on the substrates 41a and 41b by sputtering to a thickness of 2000 angstroms so that band-shaped electrodes 42a and 42b are formed on the substrates 41a and 41b, respectively. Here, the width of each band-shaped electrode is 280 $\mu$m, and the spacing between the two electrodes is 20 $\mu$m. Then, an electrical insulating layer made of SiO$_2$ and an alignment layer made of polyimide (both not shown) are formed on each substrate on which the band-shaped electrodes are formed, and rubbing treatment is performed on the surface of the alignment layers with a nylon fabric.

Next, spacer 49 are dispersed between the two substrates 41a and 41b, and these substrates 41a and 41b are arranged to face each other in such a manner that the band-shaped electrodes 42a and 42b cross each other, and the substrates 41a and 41b are put together with the seal material 45, thereby producing the display cell 40, as shown in FIG. 6.

Then, the liquid crystal regions and the polymer regions are formed in the gap between the pair of substrates 41a and 41b of display cell 40, utilizing the phase separation of the liquid crystal material and the polymerizable material in a mixed material injected into the cell 40. The liquid crystal material and the polymerizable material become the liquid crystal regions and the polymer regions, respectively.

More specifically, the mixture of the liquid crystal material and the polymerizable material is injected into the cell 40. Since the aperture ratio is about 87.1%, the mixture is prepared with the mixing ratio of the liquid crystal material and the polymerizable material being 87:13. Then, this mixture is injected into the display cell 40 by a known method for injection. Then, the mixture of the liquid crystal material and the polymerizable material conducts the phase separation by irradiation of UV light.

In Example 6, crossing portions of the band-shaped electrodes 42a and 42b become pixel regions 46. A photomask positionally aligned with respect to the pixel regions 46 is provided outsider of the cell 40, and UV light is irradiated onto the cell 40 through the photomask. During this procedure, the photopolymerizable liquid crystal material may be in an isotropic liquid state. As described above, by selectively vary the strength of light using the photomask, the phase separation the liquid crystal material and the polymerizable material in the mixture is conducted, resulting in arranging the liquid crystal regions in the pixel regions and the polymer regions in the regions other than the pixel regions.

Figure 7:
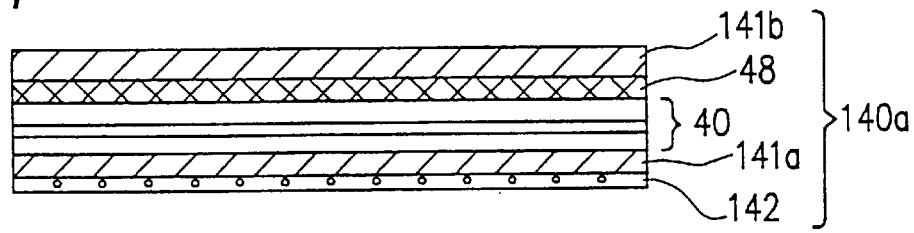
FIG. 7 is a view for describing a simple matrix type liquid crystal display device rising an STN liquid crystal material according to Example 6 presented as a specific example of Embodiment 4.

Next, as illustrated in FIG. 7, the retardation film 48 and the polarizer 141b are successively laminated on one surface of the display cell 40 produced as above, and the polarizer 141a and the reflector 142 are successively laminated on the other surface of the cell 40, thereby obtaining the liquid crystal display device 140a. As the retardation film 48 used here, any of those having the structures described in Embodiments 1 to 3 can be used. Moreover, if necessary, a retardation film having the uniform retardation throughout the film can be arranged with the retardation film 48 having different retardation depending on the location.

Figure 9:
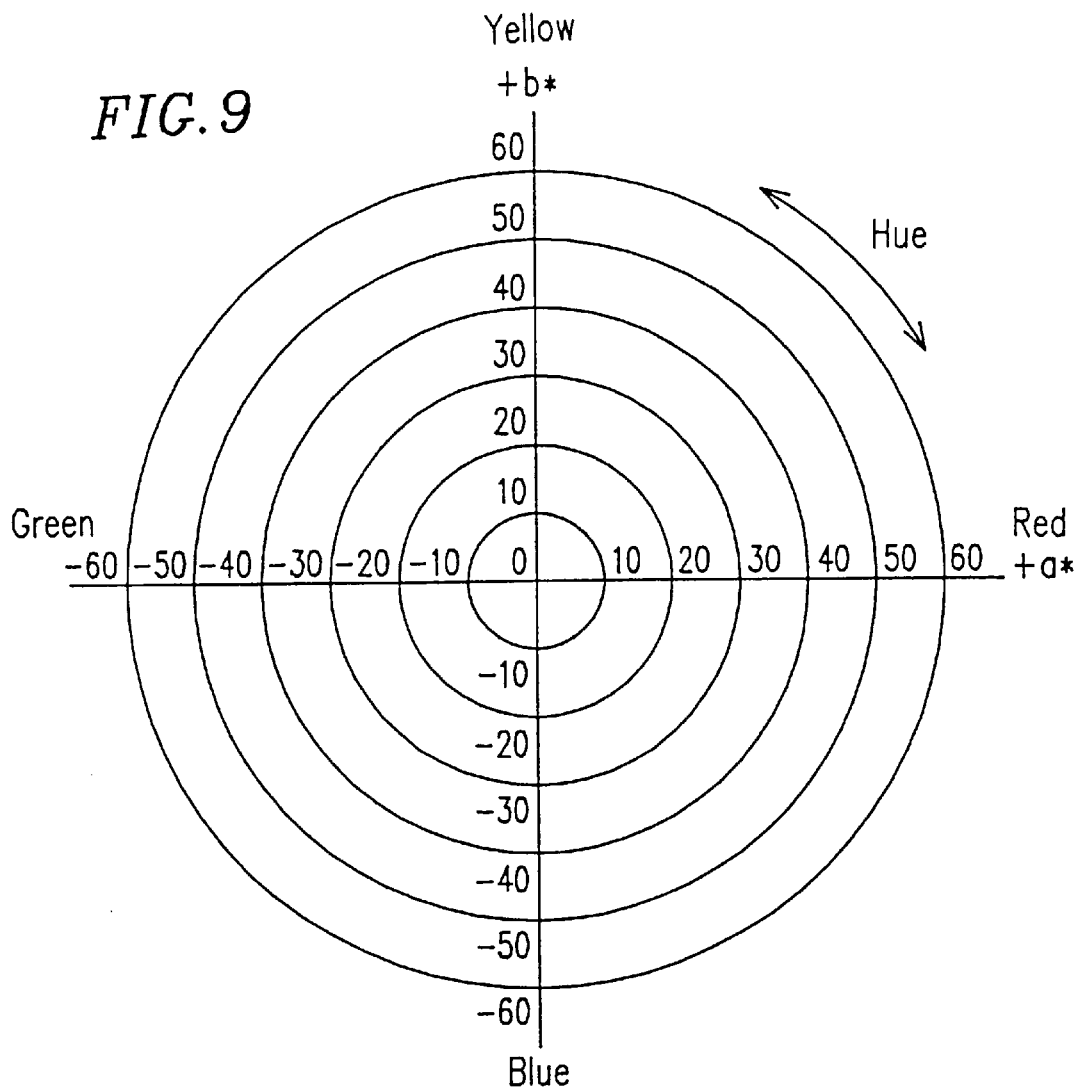
FIG. 9 is a diagram illustrating a relationship between tone of color and luminosity L* and chromaticity a* and b*.

The liquid crystal display device 140a having a structure shown in FIG. 7 was measured for luminosity L* and chromaticity a* and b* based on the color standard of CIE (Commission Internationale de l'Eclairage), and the results were L*=45, a*=3.0 and b*=3.2. FIG. 9 illustrates a relationship between the above L*, a* and b* and the color tone. In FIG. 9, the horizontal axis represents the chromaticity a* for red and its complementary color, and the vertical axis represents the chromaticity b* for yellow and its complementary color. The luminosity L* corresponds to an axis perpendicular to both coordinates illustrated in FIG. 9 coming out and into the sheet of paper.

The liquid crystal device 140a was measured for the contrast, and the result was 7. The liquid crystal display device 140a was compared with Comparison 1 to be described later. The luminosity was large for the retardation film whose the retardation was varied depending on the location as in this example. Moreover, in the case where the liquid crystal display device 140a operates in normally white mode, the displayed color was white when voltage was not applied and black when the voltage was applied.

EXAMPLE 7

In this example, several liquid crystal display devices were produced with a variety of retardation films by a method similar to the method for producing the liquid crystal display device illustrated in Example 6.

In this example, the difference in retardation between the first region and the second region of the retardation film of the liquid crystal display device, for example, between the portions of the liquid crystal display device corresponding to the liquid crystal region and to the polymer region, differs among devices. The liquid crystal display devices were compared for the brightness with respect to the L* value of the CIE system.

FIG. 11 illustrates a relationship between the difference in retardation between the first and second regions having different retardations and the value for luminosity L* based on the CIE color standards. It can be seen from FIG. 11 that an L* value larger than that obtained in Comparison 1 is obtained due to the use of the retardation film having different retardations which depends on the location when the difference in retardation between the first and the second regions having different retardations is in the range of about 90 nm to about 800 nm.

EXAMPLE 8

Next, an example of the specific structure of the modified example of the liquid crystal display device in Embodiment 4 will be described as Example 8.

In Example 8, a liquid crystal display device including the retardation film having different retardations depending on the location arranged within the simple matrix type display cell using an STN liquid crystal material will be described with reference to FIGS. 6 and 8.

Figure 8:
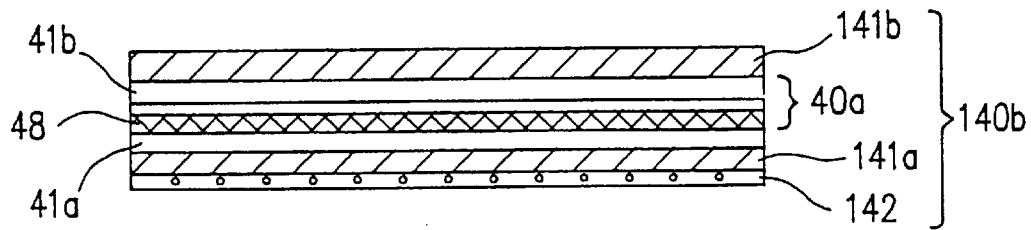
FIG. 8 is a view for describing a simple matrix type liquid crystal display device using an STN liquid crystal material according to Example 8 presented as a modification of Embodiment 4.

Reference numerals in FIG. 8 which are the same as in FIG. 7 designate the same parts as in Example 6. The liquid crystal display device 140b in Example 8 includes the liquid crystal cell 40a, the polarizers 141a and 141b sandwiching the cell 40a and the reflector 142. In the cell 40a constituted by a pair of substrates 41a and 41b which are formed of 7059 glass (manufactured by Corning Inc.), the retardation film 48 having one of the structures illustrated in Embodiments 1 to 3 is arranged to the side of at least one of the substrates which are adjacent the liquid crystal layer. In FIG. 8, the retardation film 48 is disposed on the substrate 41a.

The liquid crystal device 140b is fabricated in a similar manner to that in Example 6. More specifically, each of the substrates 41a and 41b is formed in the same manner. Then, on at least one of the substrates 41a and 41b, the retardation film 48 is disposed. After this, assembling processes for the liquid crystal cell 40a are performed in a similar manner to those in Example 6.

Then, as illustrated in FIG. 8, polarizers 141a and 141b are formed on both sides of the liquid crystal cell 40a, and a reflector 142 is further formed to the polarizer 141a side.

Also in Example 8, if necessary, a retardation film having the uniform retardation throughout the film can be arranged with the retardation film 48 having different retardation depending on the location.

When the liquid crystal display device 140b was measured for L*, a* and b* of the above-mentioned CIE, the results were L*=46, a*=2.9 and b*=3.3. The contrast of the liquid crystal display device 140*b* was measured to be 8. Moreover, when the liquid crystal display device 140*b* in Example 8 was compared with the liquid crystal display device in Comparison 1 to be described later, the luminosity was large for the retardation film having the structure where the retardation was varied depending on the location as in this example. In the case where the liquid crystal display device 140*b* operates in a normally white mode, the displayed color was white when voltage was not applied and black when the voltage was applied.

Moreover, the liquid crystal display device 140*b* produced in this example did not hare parallax as compared with the device 140*a* in Example 6, and the recognizability was high.
(Comparison 1)

In this comparative example, a display cell is produced similarly to that of Example 6 to have the liquid crystal regions and the polymer regions therein. Then, a retardation film having uniform retardation throughout the film is disposed on the outside surface of the cell, polarizers are provided on both sides of the display cell, and a reflector is provided on either side of the cell. The polarizers are arranged so that a color closest to white is displayed at the liquid crystal regions when no voltage is applied.

In the liquid crystal display device of this comparative example, the polymer regions displayed a deep blue color, thereby making the entire substrate look blue. When L*, a* and b* of CIE were measured for the entire panel, the results were L*=38, a*=−18 and b*=−23. The contrast of this device was measured to be 5. When this comparative example is compared with Examples 6 and 8, numerical values of both a* and b* are shifted to blue. Therefore, it can be seen that it is very much different from black and white display, resulting in a decrease in contrast.
Embodiment 5

Next, a liquid crystal display device according to Embodiment 5 of the present invention will be described.

Figure 10:
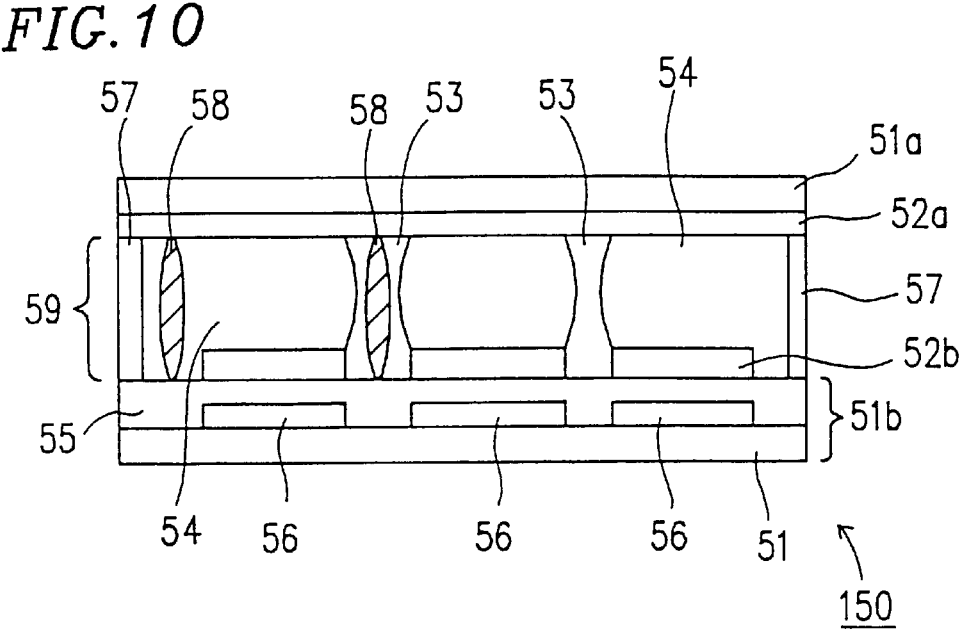
FIG. 10 is a cross-sectional view illustrating a structure of a liquid crystal display device according to Embodiment 5 of the present invention.

FIG. 10 is a cross-sectional view illustrating a liquid crystal display device according to Embodiment 5. The liquid crystal display device in the present embodiment is of a simple matrix type and includes a pair of substrates 51*a* and 51*b* and a layer 59 of display medium interposed therebetween. In the display medium layer 59, polymer regions 53 and liquid crystal regions 54, which are formed by phase separation of liquid crystal material and polymerizable material, are formed. The liquid crystal region 54 is enclosed with the polymer region 53, as shown in FIG. 10.

Moreover, band-shaped electrodes 52*a* and 52*b* are provided with a predetermined spacing on the surfaces of substrates 51*a* and 51*b* which are closer to the display medium layer 59 than the other surfaces, as shown in FIG. 10. The transparent electrodes 52*a* on the substrate 51*a* and the transparent electrodes 52*b* formed on the substrates 51*b* are in a state of mutually crossing, or in a state of perpendicularly crossing in this embodiment.

An electrical insulating layer and an alignment layer (both not shown) are formed between the transparent electrodes and the display medium layer 59 on each of the substrates 51*a* and 51*b* in such a manner that the alignment layer is located closer to the display medium layer 59 than the insulating layer. Moreover, at least one of the substrates 51*a* and 51*b* (51*b* in FIG. 10) includes a polymerized liquid crystal layer 55 having different retardations for regions corresponding to the polymer regions 53 and to the liquid crystal regions 54, which are formed on the main body 51 of the substrate 51*b*.

In Embodiment 5, the polymerized liquid crystal layer 55 includes resist layers 56 arranged to correspond to the liquid crystal regions 54 so that the retardation differs in the regions corresponding to the polymer regions 53 and to the liquid crystal regions 54. As a result, the polymerized liquid crystal layer 55 has a structure in which the thickness differs depending on the location.

Next, a method for producing a simple matrix type liquid crystal display device constituted as above will be described as follows.

First, resist layers 56 are selectively formed on the main body 51 of at least one of the substrates 51*a* and 51*b* so as to correspond to the liquid crystal regions 54, then a polymerized liquid crystal layer 55 is formed on the entire surface so that the surface of the layer 55 becomes flat. In this way, the polymerized liquid crystal layer 55 having different retardations for the regions corresponding to the liquid crystal regions 54 and the polymer regions 53 is obtained.

As to a method for forming the polymerized liquid crystal layer 55, the method is not limited to those where a structure having different thicknesses depending on the location is achieved as described above. A method such as those illustrated in Embodiments 2 and 3 where the tilt angles of the polymerized liquid crystal molecules are made different depending on the location can be used.

Then, the substrate including the polymerized liquid crystal layer 55 having different retardations depending on the location as described above is used for at least one (51*b*) of the substrates 51*a* and 51*b* constituting the liquid crystal cell 150.

As the above-mentioned polymerized liquid crystal layer 55, the following can be used. After forming a retardation film (polymerized liquid crystal layer) within the above-mentioned cell for forming the retardation film, the seal material is removed and at least one of the pair of substrates sandwiching the resultant retardation film therebetween is removed. If there are no problems associated with the substrate strength or the like, both substrates constituting the cell for formation of the retardation film may be removed, and then only the retardation film is taken out from the cell for forming the retardation film so as to be used as the at least one (51*b*) of the pair of substrates 51*a* and 51*b* constituting the display liquid crystal cell 150.

In the case where either one of the substrates 51*a* and 51*b* is the one described above which includes the polymerized liquid crystal layer 55 produced by the above-mentioned method, the other substrate is made of glass, plastic or the like.

Then, an ITO layer is deposited, for example, by sputtering on the surface of each of the substrates 51*a* and 51*b* to a thickness of 2000 angstroms. By patterning the ITO layers, band-shaped transparent electrodes 52*a* and 52*b* are formed on the substrates 51*a* and 51*b*, respectively. As a material for the substrates 51*a* and 51*b*, any material, such as glass, plastic film or the like, can be used as long as at least one of the substrates is made of a transparent material which transmits light. If one of the substrates is transparent, then the other substrate may be that which is provided with a non-transparent metal layer or the like on the surface.

Next, an electrical insulating layer is formed on each of the substrates so as to cover the transparent electrodes, for example, by sputtering. Then, an alignment layer is formed thereon, which is then subjected to the rubbing treatment with a nylon fabric or the like. The above-mentioned electric insulating layer and the alignment layer do not have to be formed when it is not necessary.

These substrates 51*a* and 51*b* are arranged to face each other in such a manner that the transparent electrodes 52*a* and 52b cross each other. Then, as shown in FIG. 10, spacers 58 are dispersed between the two substrates and the substrates 51a and 51b are put together with the seal material 57 at the edges of the substrates so that the display cell 150 is produced.

Then, a mixed material for forming a display medium layer 59 is injected through an injection hole (not shown) into the gap between the substrates 51a and 51b of the display cell 150 obtained as above. Here, a mixture material including at least a liquid crystal material and the polymerizable material is injected. The mixture of the liquid crystal material and the photopolymerizable material conducts the phase separation so as to form the liquid crystal legions 54 and the polymer regions 53, respectively.

As the liquid crystal material of the mixed material, any of conventional liquid crystal materials used in liquid crystal display devices of TN mode, STN mode, ECB mode, ferroelectric liquid crystal display mode, light scattering mode, etc. -an be used. For example, the STN liquid crystal material such as ZLI-4427 added with 3% of chiral agent S-811 (both manufactured by Merck & Co., Ltd.) can be used.

As the polymerizable material, any materials which become polymerized by light irradiation and cured such as isobornylmetachrylate, p-phenystylene (both manufactured by NIPPON KAYAKU co., Ltd.) or the like can be used. Moreover, the polymerizable material can be used alone or in combination. Furthermore, the mixed material may include a polymerization initiator. As the polymerization initiator, Irgacure 651 (manufactured by Ciba Geigy Corporation) can be used. The injection hole of the display cell 150 is sealed with a resin or the like. However, when an UV curable resin is used for sealing the injection hole, it is necessary to irradiate UV light in such a manner that the UV light is not incident on the display portion for conducting display, in which the liquid crystal regions 54 are arranged, during the sealing process of the injection hole. Moreover, it is effective to use a two component curable resin which can be cured without the irradiation of UV light or an instantaneous adhesive agent which cures when it makes contact with air as a sealing resin for the injection hole.

Next, UV light or the like is irradiated on the mixed material from the outside of the liquid crystal cell 150 for realizing the phase separation in the mixed material. During the irradiation of UV light, the substrate on which the light is incident is treated such that the energy intensity, such as the light transmission amount, becomes less in the liquid crystal regions 54 than in other regions. More specifically, in the case where UV light is irradiated, a light transmission amount distribution is selectively created, for example, by blocking the light by a photomask or by absorbing the UV light using a metal layer such as ITO, an inorganic layer or an organic layer.

As the light source, a high pressure mercury arc lamp for irradiating parallel UV light can be used. The irradiating position can be chosen arbitrarily. For example, the irradiation is performed at such position that the irradiation intensity on the substrate surface becomes 10 mW/cm$^2$.

By selectively creating the energy intensity distribution, the mixed material of the liquid crystal material and the polymerizable material experiences the phase separation. When the UV light irradiation is performed while the substrate temperature is kept high in order to stabilize the orientation of liquid crystal molecules, it is desirable to slowly cool down the inside of the cooling oven to room temperature or other low temperature (0° C. or below). Moreover, after the phase separation, in order to improve the cross-linkage of the polymers, further energy may be supplied to the polymer regions 53 by UV light irradiation or the like at room temperature or low temperature (0° C.).

Alternately, the liquid crystal cell 150 may be formed in the following manner. First, walls made of the resist layer are formed in the non-electrode region (regions other than where the electrodes are formed) of one of the substrates 51a and 51b by photolithographic treatment using a resist or a photosensitive resin. Here, as the resist material, OFPR-800 (manufactured by Tokyo Ohka Kogyo Co., Ltd.) can be used. Furthermore, the above-described liquid crystal such as ZLI-4427 added with 3% of the chiral agent, for example, S-811 (both manufactured by Merck & Co., Ltd.) is dropped on the surface of one of the substrates 51a and 51b. Then, the substrates 51a and 51b are put together with the seal material 57 in such a manner that the electrodes on one of the substrates cross the electrodes on other substrate, as shown in FIG. 10. Spacers 58 are dispersed between the substrates if necessary. As a result, the display medium layer 59 where the liquid crystal regions 54 and the polymer regions 53 are selectively formed at arbitrary positions is formed between the two substrates 51a and 51b. Here, the liquid crystal regions 54 are arranged in the pixel regions and the polymer regions 53 are arranged in the non-pixel regions.

While specific numerical values such as film thickness and electrode width after the ITO band-shaped electrode formation process were set to be the same as those illustrated in Example 6, the liquid crystal cell 150 having the structure shown in FIG. 10 was produced. The liquid crystal display device including the produced liquid crystal cell 150 was measured for the $L^*$, $a^*$ and $b^*$ of the CIE. The results were $L^*$=47, $a^*$=2.8 and $b^*$=3.0. The contrast of this device was measured to be 8. When compared with the one in Comparison 1, this device including the polymerized liquid crystal layer 55 whose retardation is different depending on the location was found to be brighter. Moreover, in the case where the polarizers are disposed on the both sides of the liquid crystal cell 150 so that the liquid crystal cell 150 is used in the normally white mode, a white color is displayed when voltage is not applied, while a black color is displayed when voltage is applied.

Moreover, the threshold voltage value of the liquid crystal display device according to Embodiment 5 is almost the same as that of the device produced in Comparison 1, and is lower than the device in Example 8 by 0.1 V. The reason is that in the liquid crystal display device in Example 8, the polymerized liquid crystal layer as the retardation film is present between the band-shaped electrodes and the display medium layer; however, in the liquid crystal display devices in Embodiment 5 and Comparison 1, the polymerized liquid crystal layer is not present between the band-shaped electrodes and the liquid crystal region. As in Embodiment 5, by having the polymerized liquid crystal layer 55 which also serves as an insulating layer within the substrate 51b, an increase in threshold voltage can be inhibited.

As described above, according to the present invention, since the retardation film has a structure where the thickness is different depending on the location, regions having different retardations can easily be formed within the film. If such a retardation film is used together with a liquid crystal cell where regions of optically isotropic and anisotropic states coexist, it is possible to adjust the tone of color by a single retardation film. Such a retardation film can be easily obtained, since it is produced by polymerizing a polymerizable liquid crystal material while the polymerizable liquid crystal material is interposed between a pair of substrates whose surfaces are processed into concave and convex configuration.

The surfaces of the substrates can be processed to have concavities and convexities by using a liquid crystal resist material or a dry film. In the case of the liquid crystal resist material, the concavities and convexities are formed on the surfacers of the substrates by the application, exposure and development processes. This makes it possible to easily produce a retardation film made of the polymerized liquid crystal material and having concave and convex portions. In another case of using the dry film, the dry film can be successively put to the substrate (plastic film), thereby efficiently forming the concave and convex portions on the substrate. As a result, a method for producing the retardation film with excellent producibility can be provided.

Alternatively, according to the present invention, the retardation film is formed of a polymerized liquid crystal material where the tilt angles of the liquid crystal molecules constituting the retardation film are different depending on the location. Therefore, regions having different retardations created between ordinary light and extraordinary light can easily be formed within a single retardation film. In addition, by setting a difference in the retardations created between the first and the second regions to be almost 90 nm to 800 nm, the tone of color of the visible light can be corrected. Therefore, it is extremely effective to apply this retardation film to an optical display device such as a liquid crystal display device for the color tone correction of the display.

The above-mentioned retardation film in which the tilt angle of the polymerized liquid crystal molecules is varied depending on location is produced by polymerizing a polymerizable liquid crystal material while the polymerizable liquid crystal material is put between the substrates having the organic molecular layer selectively formed on their surfaces. Thus, the tilt angle of the polymerized liquid crystal molecules can be varied for the regions of the substrates where the organic molecular layer is formed and where the organic molecular layer is not formed. This makes it possible to create regions having different retardation within the retardation film on the order of micro-meters.

Moreover, when photochromic molecules are used as in the conventional retardation film, since structural isomerization of the photochromic molecules and polymerization of the polymerizable liquid crystal molecules occur by light irradiation in the wavelength regions extremely close to each other, it is extremely difficult to form regions of different tilt angles of the polymerized liquid crystal molecules. However, according to the present invention, by using an organic molecular layer the polymerizable liquid crystal material can be polymerized in a state that the tilt angles of the liquid crystal molecules are set at desired angles, the retardation film having different retardations depending on the location can easily be produced.

According to the present invention, a retardation film having different retardations depending on the location is applied to a liquid crystal display device which includes polymer regions which are in an optically isotropic state and liquid crystal regions within the display region. Thus, the tone of color can be separately corrected for the liquid crystal regions and the polymer regions and it becomes possible to produce a bright liquid crystal display device. Moreover, since it becomes possible to correct a plurality of color tones having different retardations by a single retardation film, the producibility becomes excellent and the film is industrially effective.

In addition, the retardation film is disposed between a pair of substrates constituting a liquid crystal cell of the liquid crystal display device. This reduces a parallax occurring when the retardation film is disposed outside of the liquid crystal cell, thereby producing a liquid crystal display having high recognizability.

Alternatively, a liquid crystal display device of the present invention includes a pair of substrates constituting a liquid crystal cell together with a display medium layer, at least one of which has retardations different for regions corresponding to the liquid crystal regions and regions corresponding to the polymer regions. Thus, the tone of color in the liquid crystal regions and the polymer regions can be compensated by means of such a substrate constituting the cell without a separately provided retardation film.

In addition, the above-mentioned substrate includes a polymerized liquid crystal layer formed on a main body of the substrate so that the polymerized liquid crystal layer is located on the opposite side of electrodes for voltage application to the display medium layer. Therefore, voltage can effectively be applied to the liquid crystal regions of the display medium layer, thereby reducing the power consumption of the liquid crystal display device. Moreover, the above-mentioned substrate includes regions corresponding to the liquid crystal regions have different retardation from that of regions corresponding to the polymer regions. Thus, the regions having different retardations can easily be created within the substrates and the substrate which can easily perform the color tone correction of the liquid crystal regions and the polymer regions can be produced.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a retardation film, comprising the steps of:

arranging a pair of substrates to face each other to form a gap therebetween;

filling the gap with a polymerizable liquid crystal material;

polymerizing the polymerizable liquid crystal material;

prior to the step of arranging the substrates, forming on a surface of at least one of the substrates a flat surface pattern including at least one of a concavity and a convexity, and thereafter arranging the substrate so that the surface having the flat surface pattern is in contact with the polymerizable liquid crystal material when the polymerizable liquid crystal material is filled and polymerized to form a pattern corresponding to the flat surface pattern on the polymerized liquid crystal material.

2. A method for producing a retardation film comprising the steps of:

arranging a pair of substrates to face each other to form a gap therebetween;

filling the gap with a polymerizable liquid crystal material; and polymerizing the polymerizable liquid crystal material; and wherein at least one of the substrates has a surface on which a flat surface pattern including at least one of a concavity and a convexity is formed, the substrates being arranged so that the surface having the flat surface pattern being in contact with the polymerizable liquid crystal material when the polymerizable liquid crystal material is filled, thereby a pattern corresponding to the flat surface pattern is formed on the polymerized liquid crystal material, further comprising a step of forming the flat surface pattern on the surface of the at least one of the substrates by using a resist material, prior to the step of arranging the substrates.

3. A method for producing a retardation film comprising the steps of:

arranging a pair of substrates to face each other to form a gap therebetween;

filling the gap with a polymerizable liquid crystal material; and polymerizing the polymerizable liquid crystal material; and wherein at least one of the substrates has a surface on which a flat surface pattern including at least one of a concavity and a convexity is formed, the substrates being arranged so that the surface having the flat surface pattern being in contact with the polymerizable liquid crystal material when the polymerizable liquid crystal material is filled, thereby a pattern corresponding to the flat surface pattern is formed on the polymerized liquid crystal material, further comprising a step of forming the flat surface pattern on the surface of the at least one of the substrates by using a dry film which is patternable by photolithography, prior to the step of arranging the substrates.

* * * * *